United States Patent
Van Abeelen et al.

(10) Patent No.: US 7,952,792 B2
(45) Date of Patent: May 31, 2011

(54) REFLECTIVE DISPLAY AND METHOD FOR MANUFACTURING SUCH A DISPLAY

(75) Inventors: Frank Anton Van Abeelen, Eindhoven (NL); Alexander Victor Henzen, Bladel (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 12/593,930

(22) PCT Filed: Apr. 2, 2008

(86) PCT No.: PCT/IB2008/051235
§ 371 (c)(1),
(2), (4) Date: Sep. 30, 2009

(87) PCT Pub. No.: WO2008/122927
PCT Pub. Date: Oct. 16, 2008

(65) Prior Publication Data
US 2010/0118383 A1 May 13, 2010

(30) Foreign Application Priority Data
Apr. 6, 2007 (EP) .................... 07105833

(51) Int. Cl.
*G02B 26/00* (2006.01)
(52) U.S. Cl. ....................................... 359/296

(58) Field of Classification Search ........... 359/296; 362/606, 615, 617; 345/107, 105; 430/32, 430/34, 38; 204/600, 450
See application file for complete search history.

(56) References Cited

U.S. PATENT DOCUMENTS

| | | | |
|---|---|---|---|
| 6,819,471 B2 * | 11/2004 | Amundson et al. | 359/296 |
| 7,375,875 B2 * | 5/2008 | Whitesides et al. | 359/296 |
| 7,400,439 B2 * | 7/2008 | Holman | 359/298 |
| 7,671,935 B2 * | 3/2010 | Mather et al. | 349/65 |
| 2003/0117682 A1 | 6/2003 | Clikeman et al. | |

FOREIGN PATENT DOCUMENTS

| | | |
|---|---|---|
| DE | 20200501475 U1 | 10/2005 |
| JP | 2001134204 A | 5/2001 |
| WO | 03050607 A1 | 6/2003 |
| WO | 03089983 A1 | 10/2003 |

* cited by examiner

*Primary Examiner* — Ricky L Mack
*Assistant Examiner* — Tuyen Q Tra

(57) ABSTRACT

The invention relates to a reflective display (1) comprising a substrate (4) and a reflective layer (3), e.g. comprising microcapsules (2) with an electrophoretic suspension arranged to reflect incident light (12) passing through the substrate (4), wherein the substrate (4) is structured so as to form a plurality of funnel-shaped protrusions (7) with reflective walls (8), the protrusions being oriented with a top end (72) facing towards the reflective layer and a base end (71) facing away from the reflective layer. According to this design, light that is reflected at sufficiently large reflection angles will experience one or more reflections by the protrusion walls (8). At each reflection the angle of propagation of the light (11) traveling through the substrate is decreased by twice the angle alpha between the wall (8) and the normal of the reflective layer (3).

16 Claims, 5 Drawing Sheets

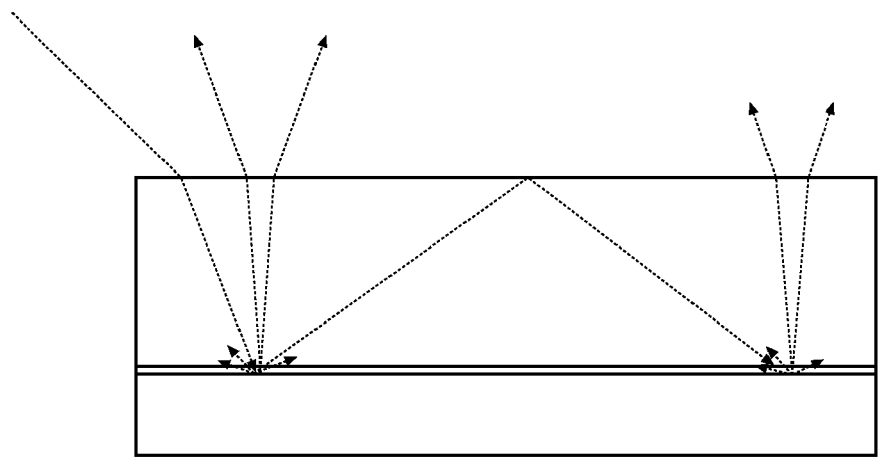
(Prior art) Fig. 1
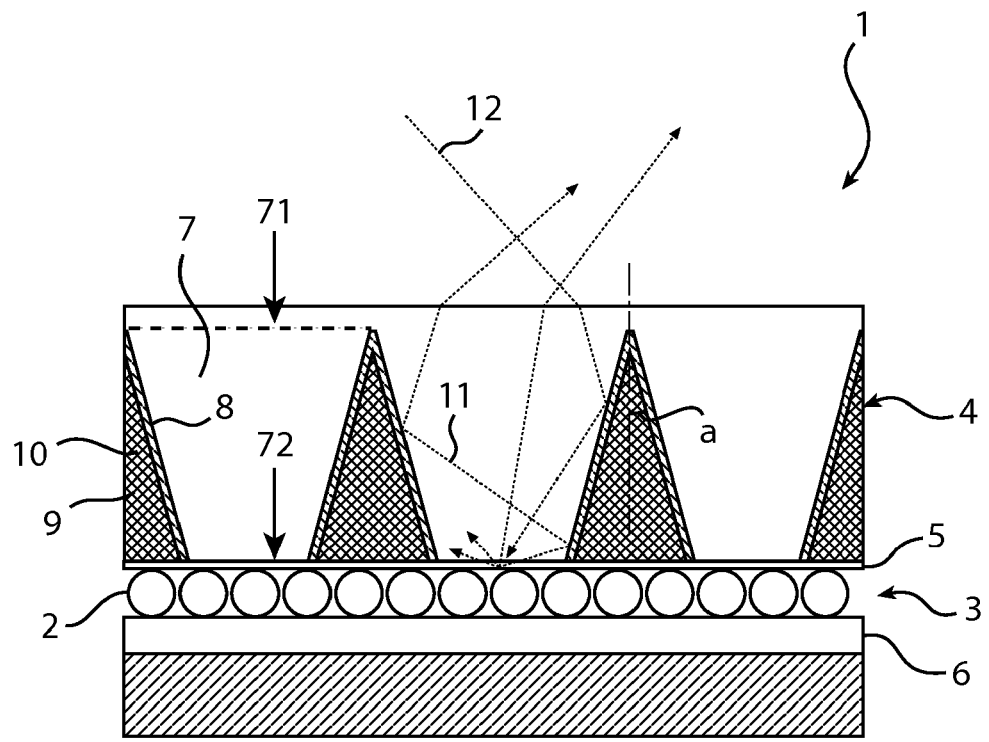
Fig. 2

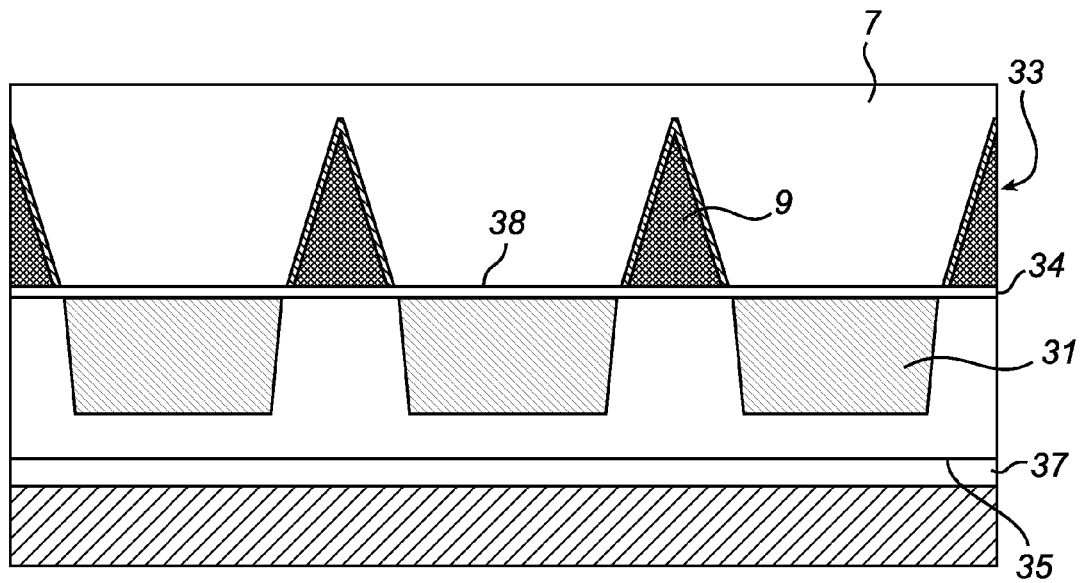
*Fig. 6*
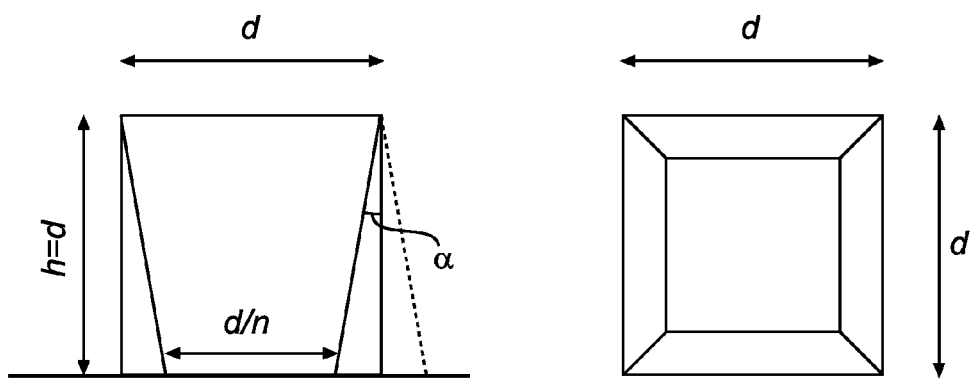
*Fig. 7a*  *Fig. 7b*

REFLECTIVE DISPLAY AND METHOD FOR MANUFACTURING SUCH A DISPLAY

FIELD OF THE INVENTION

The present invention relates to a reflective display comprising a substrate and a reflective layer arranged to reflect incident light.

The present invention also relates to a method for manufacturing such a reflective display.

BACKGROUND OF THE INVENTION

In a display of the above mentioned kind, e.g. an electrophoretic display, light that is reflected at the reflective layer cannot escape through the substrate into air if the reflection angle $\theta_s$ (angle with respect to the normal of the scattering layer) is larger than the critical angle $\theta_{TIR}$. The critical angle $\theta_{TIR}$ is given by arcsin $1/n_s$, where $n_s$ is the index of refraction of the substrate. Typically, light that cannot propagate into air experiences total internal reflection when it reaches the substrate-air interface. This means that a large portion, typically almost 60%, of the light is reflected back into the display. This is illustrated in FIG. 1.

Light that is reflected into the display can be reflected by the reflective layer a second time, and the fraction of light that again experiences total internal reflection can be reflected for a third time, and so on. Such recycling can limit the loss of light, but in present displays the efficiency of this process is rather low, due to diffuse reflectance $R_s$ of the reflective layer significantly less than 1, and absorption by an electrode layer (ITO) on the substrate.

Moreover, between two backscattering events the light may travel a certain distance parallel to the display surface away from the original reflecting position. For a typical thickness of the substrate of one to a few hundred micrometers, the average traveled distance is larger than the typical pixel size of about 200 micrometer. The total amount of light that is received by a pixel thus depends on the state of neighboring pixels, i.e. the perceived brightness of a pixel depends on the state of neighboring pixels. This is called optical cross-talk and becomes more visible for higher recycling efficiencies.

For encapsulated electrophoretic displays using reflective and absorbing particles dispersed in a fluid contained in capsules, such as an E-Ink® display, $R_s$ is typically near 70% in the white state and the externally perceived diffuse reflectance $R_{ex}$ of a fully white display (i.e. where all neighboring pixels are also in the white state) is only about 40%. This is marginally sufficient for monochrome displays but not enough to build a full-color display by adding color filters. Even if colored pixels are used in combination with white pixels (RGBW scheme) a color display in a fully white state will have at best only half of the brightness of the white state of a monochrome display.

For electrophoretic displays using scattering particles dispersed in an absorbing fluid contained in compartments $R_{ex}$ is typically about 30% and even monochrome displays have insufficient brightness.

SUMMARY OF THE INVENTION

It is an object of the present invention to overcome this problem, and to provide a reflective display with improved reflectance.

This and other objects are achieved with a reflective display having a viewing side, the display successively comprising from the viewing side a transparent substrate and a reflective layer, characterized in that the substrate comprises a plurality of funnel-shaped protrusions, each protrusion comprising a base end having a base surface area facing the substrate, a top end having a top surface area facing away from the substrate towards the reflective layer, and one or more side walls connecting the base end and the top end, the base surface area being larger than the top surface area, and the side walls being arranged to reflect light that is transmitted through the protrusion.

According to this design, light that is reflected at sufficiently large reflection angles will experience one or more reflections by the protrusion walls. At each reflection the angle of propagation of the light traveling through the substrate is decreased by twice the angle α between the wall and the normal of the reflective layer (also referred to as the z-axis).

The present invention is particularly useful in cases where part of the light is reflected at an angle of total internal reflection defined by the interface between substrate and ambient atmosphere. Preferably, the funnel-shaped protrusions are formed such that reflections decrease the propagation angle until, when the light reaches the substrate/ambient interface, the propagation angle of the light will be smaller than $\theta_{TIR}$, i.e. the angle of total internal reflection defined by the refractive indices of the substrate and the ambient. In a typical case, the ambient is air, with a refractive index of approximately 1, and the $\theta_{TIR}$ is arcsin($1/n_s$), where $n_s$ is the index of refraction of the substrate. In a typical case, the substrate is glass or a transparent plastic, with a refractive index of approximately 1.5.

As internal reflection is avoided, the perceived reflectance of the display is increased. As internal reflection at the substrate/ambient interface is limited, the problem of optical cross talk between pixels is also reduced or eliminated.

As the incident angle is reduced when light enters the substrate layer from air, even light with large incident angles $\theta_{in}$ will pass through the funnels and reach the reflective layer after only a few reflections, i.e. it reaches the reflective layer before it is backreflected by the funnel walls.

As all light can enter the device and the entire backscattered fraction $R_s$ can propagate back into the ambient atmosphere (neglecting Fresnel reflections at the interface for angles smaller than $\theta_{TIR}$), the exterior contrast is the same as the intrinsic contrast of the reflective layer: $R_s$[white state]/$R_s$[black state].

A more mathematical description can be given in terms of etendue. Simply stated the etendue is the product of the spatial and angular extent of a light beam at a certain point along its path. Along the direction of propagation, etendue multiplied by the square of the local refractive index cannot be reduced without absorbtion of light, and for ideal optical components is conserved. The maximum etendue that can leave from one pixel of the display corresponds to an angular extent over the full hemisphere and the total pixel area.

In case of Lambertian reflection, the angular spread immediately after reflection extends over the full hemisphere. Therefore the reflecting area must be a factor $n_s^2$ smaller than the full pixel area. In the opposite direction, external light with the maximum etendue that can impinge on one pixel can be exactly compressed onto an area that is a factor $n_s^2$ smaller than the full pixel area at a point where it is immersed in a medium with refractive index $n_s$. In summary, if the ratio of the base surface area and the top surface area of each funnel-shaped protrusion is smaller than $n_s^2$, not all reflected light can leave the display. If the ratio is larger, not all incident light can reach the reflective layer. In practice, the ratio of the base surface area and the top surface area of each funnel-shaped protrusion need not be exactly $n_s^2$. Depending on the specific reflective layer that is used, the etendue of the reflected light may be smaller than for perfect Lambertian reflection, allowing a ratio smaller than $n_s^2$. The etendue of the external illumination may also be smaller than the maximum, allowing a ratio larger than $n_s^2$. A slightly larger ratio will concentrate to some extent the light leaving the device in the normal viewing direction.

Simulations have shown that the gain in perceived reflection of the display is reduced to essentially zero if the above-mentioned ratio is smaller than $0.5\ n_s^2$ or larger than $1.5\ n_s^2$.

Conservation of etendue can also be applied to symmetry planes and the ratio of the dimensions of the top and bottom of the funnel inside such a plane should be $n_s$. In other words, compression should take place in both the x and y directions.

Concerning the base ends, the base surface area is preferably such that the base ends cover the entire substrate, i.e. the base ends of the funnel-shaped protrusions interconnect to form a homogenous substrate. The base surface area may be rectangular, but may also be e.g. triangular or hexagonal. Concerning the top ends facing the reflective layer, the top surface areas will not cover the entire surface of the display, and the geometrical shape of these top surface areas may be different.

The funnel-shaped protrusions may be formed by forming grooves in the substrate. The grooves may be void or covered with a filling material. The fact that a part of the reflective layer is covered by filling material between the funnel-shaped protrusions does not matter for a reflective display. This is an important difference compared to an emissive display: for an emissive display that emits from the entire pixel area, the reduction of the emissive area by a factor $n_s$ will eliminate the gain from avoiding total internal reflection. For a typical encapsulated electrophoretic display, the remaining area is still large enough to contain several capsules.

The side walls of the funnel-shaped protrusions may have essentially flat surfaces, but may also be curved in a suitable fashion. Such curvature may further improve the function of the protrusions.

BRIEF DESCRIPTION OF THE DRAWINGS

This and other aspects of the present invention will now be described in more detail, with reference to the appended drawings showing a currently preferred embodiment of the invention.

FIG. 1 shows a reflective display according to prior art.

FIG. 2 shows an electrophoretic display according to a first embodiment of the present invention.

FIG. 6 shows an electrophoretic display according to a third embodiment of the present invention.

FIG. 7 shows a schematic model used to simulate an embodiment of the invention.

Figure 3:
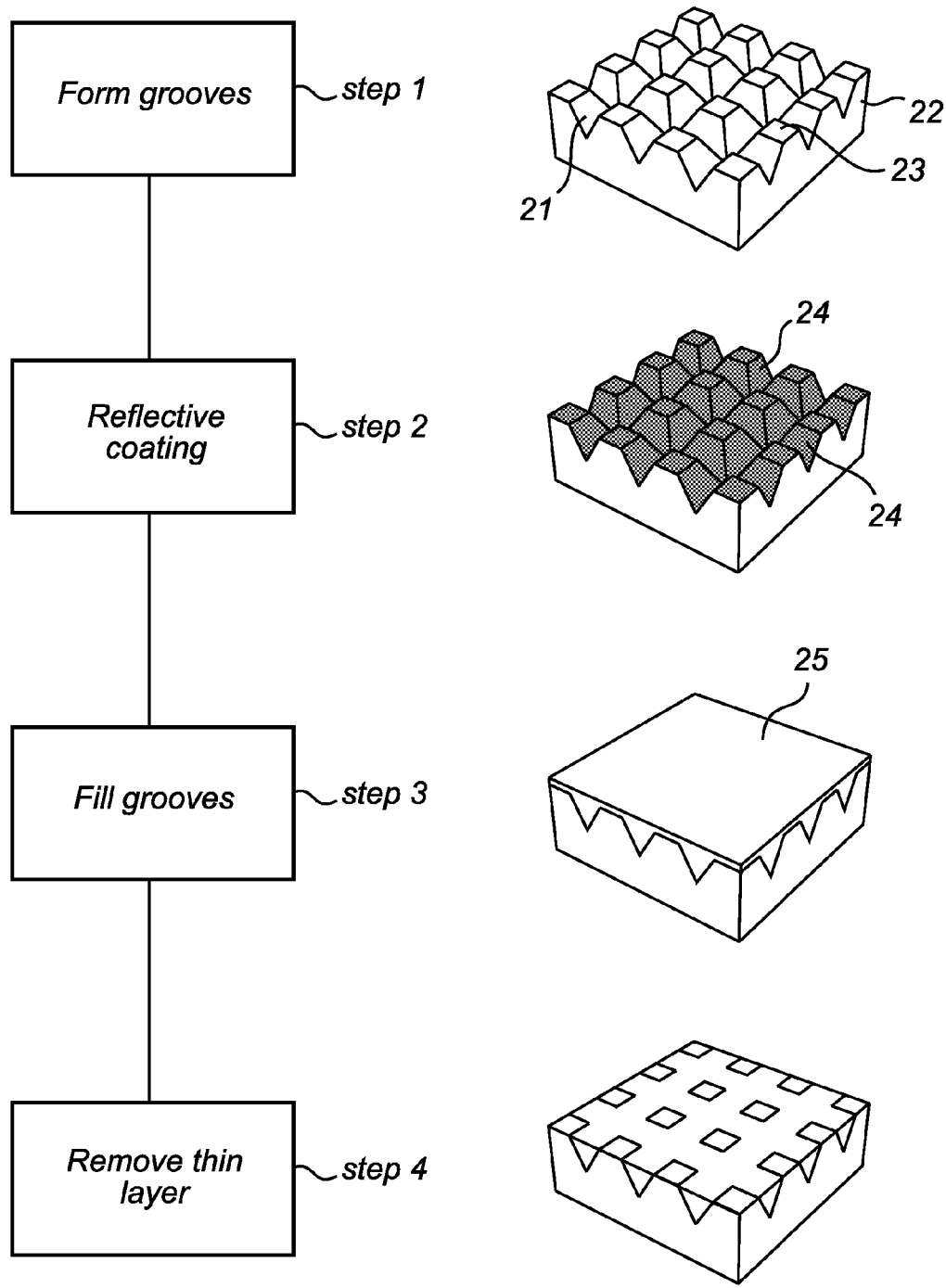
FIG. 3 shows a process for manufacturing the substrate in FIG. 2.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION OF THE EMBODIMENTS

The present invention will now be described with reference to FIG. 2, showing an encapsulated electrophoretic display 1. In such a display two types of particles with opposite electric charges are dispersed in a suspending fluid having a refractive index $n_f$. The particles include "black" particles that absorb light, and "white" particles that scatter light. The fluid with particles is contained in microcapsules that are arranged in a reflective layer 3 and held together by a binder. They are supported by a substrate 4 coated with a transparent electrode 5 (ITO). The substrate has a refractive index $n_s$ similar to or larger than $n_f$ and the refractive index of ITO ($n_{ITO}$) is typically larger than both $n_s$ and $n_f$ (with a small imaginary part). Additional protective layers may be present but are not shown in the figure.

Below the reflective layer 3 is a patterned electrode 6 and the driving electronics. Between the top and bottom electrodes 5 and 6 an electric field can be generated that causes movement of the particles in the capsules 2. Depending on the polarity on the field, either the white or the black particles are drawn to the top of the capsules. If the white particles are at the top, a large fraction of the light impinging on the display is diffusely reflected and that area of the display has a white appearance. If the black particles are on top, most of the incident light is absorbed and the display appears black. Intermediate grey states can also be created. The pixels in the display typically extent over several capsules. As a result, variations in capsule size and response are averaged out.

According to the invention, the substrate is provided with a plurality of funnel-shaped protrusions 7 with reflective walls 8. The protrusions are separated by pointed spaces 9, preferably filled with a filling material 10. Each protrusions are oriented with its top surface area 72 facing towards the reflective layer 3, and its base surface area 71 facing away from the reflective layer 3. Preferably, the top surface areas 72 of the protrusions 7 overlay the pixels of the display, typically defined by the patterned electrodes 6.

Scattered light 11 can enter the protrusions 7, and may be reflected by the walls 8 before reaching the top end of the protrusion. At each reflection, the angle of propagation of the light traveling through the substrate is decreased by twice the angle α between the protrusion wall 8 and the normal of the reflective layer 3.

The protrusions 7 will also affect incident light 12, which may be reflected by the reflective walls 8. If the ratio of the top surface area 72 and the base surface area 71 (also referred to as the top-to-base ratio) of the protrusion 7 is chosen correctly, in principle all light will be able reach the reflective layer 3. Whether that is actually realized also depends on other dimensions of the funnel-shaped protrusion 7. A fraction of the incident light 12 may not be able to reach the reflective layer 3, but will be backreflected after a number of reflections by the walls 8. The intensity of these "direct" reflections is related to the angle α. If α is smaller the effect is reduced. For fixed pixel size and top-to-base ratio of the funnel-shaped protrusion 7, a smaller α means a larger height h of the protrusion.

When the reflective layer 3 generates an approximately Lambertian distribution of reflected light in the substrate, the ratio between the base surface area 71 and the top surface area 72 of each protrusion 7 is preferably close to $n_s^2$. If the reflective layer 3 comprises a suspending fluid with refractive index $n_f$ having scattering particles dispersed therein, the scattered light must be transported from the medium with refractive index $n_f$ (where it has an approximately Lambertian distribution) to an ambient atmosphere. In that case, the ratio between the base surface area 71 and the top surface area 72 of each protrusion 7 is preferably close to of $n_f^2$.

Figure 9:
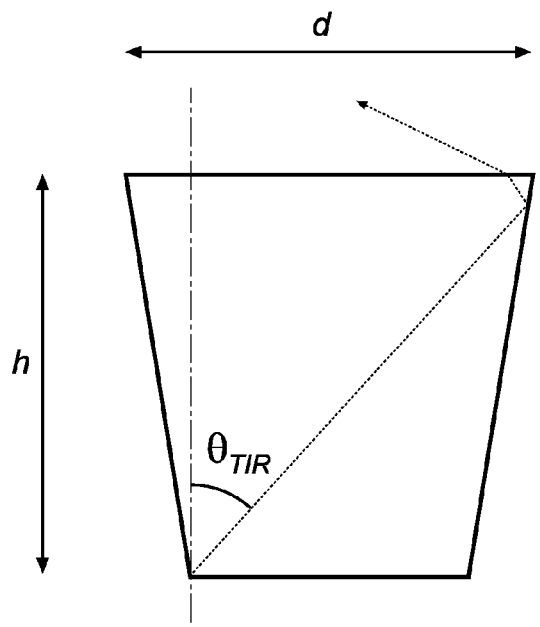
FIG. 9 shows reflection of light from a corner of a protrusion.

As illustrated in FIG. 9, for a given ratio between top and base surface areas, the height h of the funnel should be sufficiently large so that light that is reflected to a propagation angle larger than $\theta_{TIR}$ near one of the corners of the funnel base cannot reach the top of the funnel without any reflection. For the case where the ratio between base and top surface areas is $n_s^2$, this corresponds to choosing $$h > d \cdot \frac{n_s + 1}{2n_s} \cdot \sqrt{n_s^2 - 1}$$

where d is the width of the base end of the protrusion.

In the case with straight side walls 8, defining an angle $\alpha$ between the wall 8 and the normal of the reflective layer 3, this corresponds to:

$$\alpha < \arctan\left[\frac{\sqrt{n_s^2 - 1}}{(n_s + 1)^2}\right]$$

A substrate with funnel-shaped protrusions 7 can be manufactured in a simple process, illustrated in FIG. 3. The process comprises four steps:

First, in step 1, grooves 21 are embossed or cut in a transparent substrate 22, so as to form funnel-shaped protrusions 23 between the grooves 21. The grooves 21 may have various extensions and cross sections, depending on the desired protrusion shape. In the illustrated example the grooves are formed in a square grid pattern and have triangular cross section, so as to form protrusions in the form of truncated pyramids 23. The square base ends of the truncated pyramids 23 join together to fill the entire substrate surface. A similar effect can be obtained with triangular or hexagonal bases, which would require slightly different grooves. Also, the cross section of the protrusions need not be the same at the top ends (that will be facing the reflective layer). If found advantageous, the top ends may have a different cross section, e.g. a circular cross section.

For easy manufacture, the funnel substrate may be thicker than the height of the funnel-shaped protrusions, i.e. the grooves do not extend through the substrate. This has little effect on the brightness gain that can be realized. Also, there is less need to limit the thickness of the substrate, as the protrusions according to the invention will reduce or eliminate any optical crosstalk.

In step 2, a reflective layer 24 is formed on the walls of the grooves/protrusions, for instance by providing a metal coating in the grooves. Because this is hard to avoid, the top ends of the funnel-shaped protrusions will typically also be coated.

Then, in step 3, the grooves are filled with a filling material 25. The filling material has no optical function so many choices are possible. Note that steps 2 and 3 may be performed as one step, if the filling material is chosen so as to ensure reflective walls. For example, the grooves may be filled completely with metal or other reflective material.

In step 4 a thin layer is removed from the processed substrate to clear the surfaces of the protrusions 23.

Figure 4:
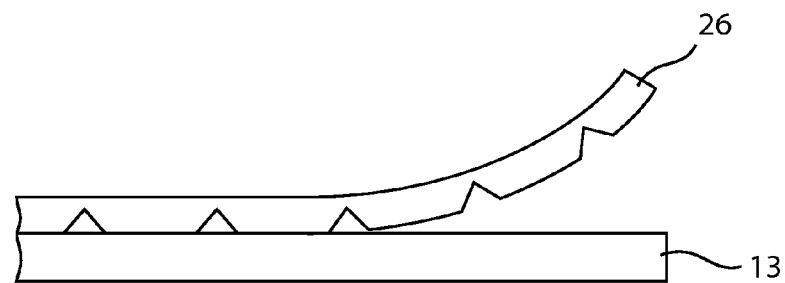
FIG. 4 shows an alternative way to manufacture the substrate in FIG. 2.

The structured substrate 22 can form the substrate 4 in FIG. 2. Alternatively, the structured substrate 22 is a relatively thin foil 26, that is laminated on top of an existing substrate 13 of an electrophoretic display according to the prior art. This is shown in FIG. 4. The distance between the reflective layer and the top ends of the funnel-shaped protrusions is determined by the existing substrate (25 µm substrates are already used), and should be as thin as possible. This intermediate distance allows incident light to exit the top end of the funnel-shaped protrusion and propagate outside the boundaries of the top end before it reaches the reflective layer. A part of the reflected light therefore cannot enter the funnel-shaped protrusion, and is lost. Preferably, this intermediate distance (existing substrate thickness) is smaller than 0.1 times the pixel pitch, even more preferably smaller than 0.05 times the pixel pitch.

Figure 5:
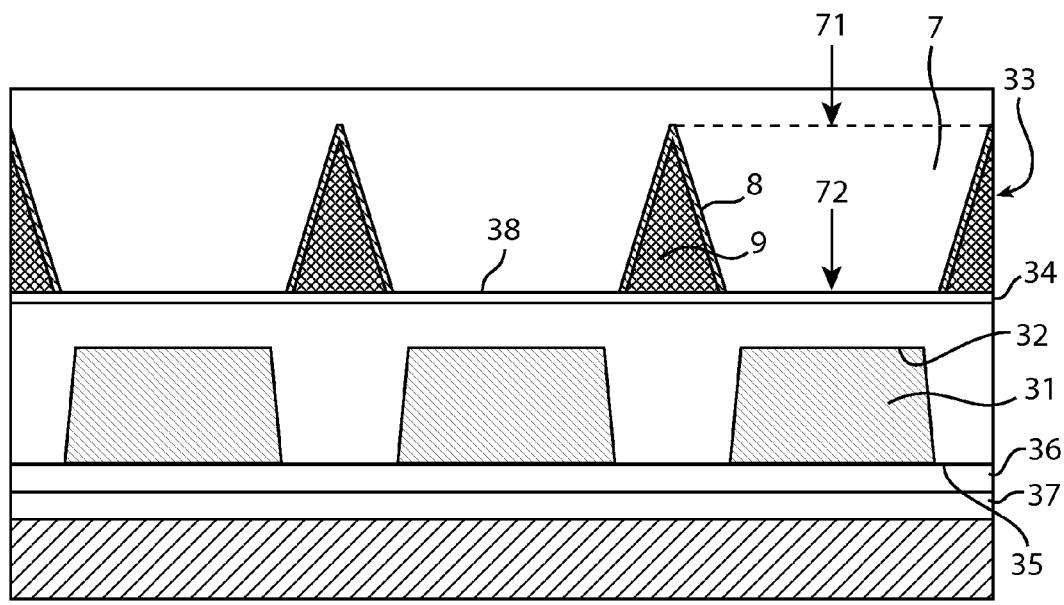
FIG. 5 shows an electrophoretic display according to a second embodiment of the present invention.

A second embodiment will be described with reference to a display as shown in FIG. 5. In this case, white particles are dispersed in a black (or colored) fluid contained in cup-shaped compartments 31. Usually, the bottoms 32 of the compartments face the viewer. The compartments are supported by a substrate 33 coated with a transparent electrode 34. The open end 35 is closed by a sealing layer 36 and the structure is laminated to a patterned electrode 37 plus driving electronics. Under the influence of an applied electric field the particles move through the fluid. If the white particles are at the surface of the cups that faces the viewer, that area of the display appears white. Otherwise, the color of the fluid is visible. Intermediate states are also possible.

According to the present invention, again the structured substrate 33 is provided with funnel-shaped protrusions 7 with reflective side walls 8. Note that in this case, it is advantageous to align the funnel-shaped protrusions 7 with the compartments 31 such that the top surface areas 72 overlay the compartments 31. With such alignment, the funnel-shaped protrusions 7 will guide incident light towards the compartments 31, i.e. the active portions of the display device. In other words, the inactive portions of the display device (portions between the compartments) are shielded, resulting in a significant additional brightness gain.

As in the first embodiment, the structured substrate 33 can be formed according to the process in FIG. 3. It can also be laminated on top of a device according to the prior art, as indicated in FIG. 4. In the first case, the distance between the reflective layer and the top ends of the funnel-shaped protrusions is determined by the thickness of the bottoms of the compartments. In the second case, the thickness of the original substrate must be added to that.

To reduce the distance, the compartments may be reversed and the structured substrate may be used instead of the sealing layer, as shown in FIG. 6.

Simulations show that this concept works. A side and top view of the simulation model are shown in FIGS. 7a and b. It represents one pixel. The medium inside the funnel-shaped protrusion has a refractive index (n) of 1.5. The height (h) of the funnel-shaped protrusion equals the width (d) at the base end (absolute sizes do not matter, only relative sizes). The width at the top end is d/n. The corresponding tilt ($\alpha$) of the funnel walls is 9.5°. The funnel walls are perfect mirrors. The reflective layer is modeled as a Lambertian reflector with a diffuse reflectance ($R_s$) of 0.6.

Figures 8A, 8B:
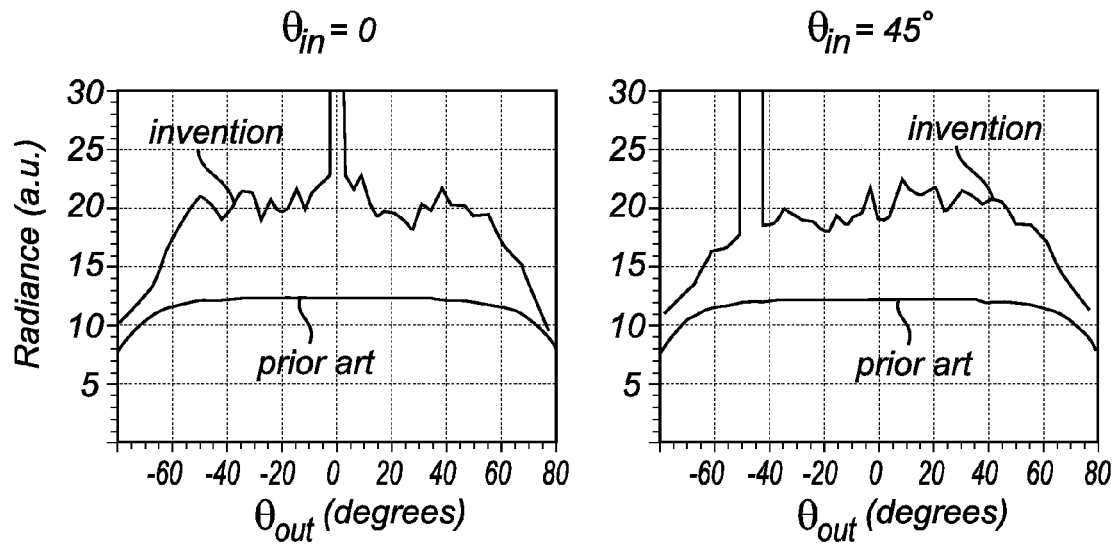
FIG. 8 shows the results of the simulation.

The externally reflected radiance was simulated for different angles of incidence $\theta_{in}$ of the external light with fixed energy flux per pixel. FIGS. 8a and b shows the results for $\theta_{in}=0$ and $\theta_{in}=45°$, respectively, for the model display with and without the invention. At normal viewing angle $\theta_{out}=0$ a brightness gain of more than 50% is obtained. Radiance remains approximately constant in a large viewing cone.

A fraction of the incident light will not be able to reach the reflective layer at the top end of the funnel-shaped protrusions. Instead it produces "direct" reflections (in addition to the always present specular Fresnel reflection off the display surface). However, these reflections occur only at very large viewing angles. The phenomenon results in a loss of the gain in terms of diffusely reflected light, but for $\theta_{in}=75°$ there is still a 20% gain left. Simulations confirm that the external contrast corresponds to the intrinsic contrast of the scattering layer.

The person skilled in the art realizes that the present invention by no means is limited to the preferred embodiments described above. On the contrary, many modifications and variations are possible within the scope of the appended claims. For example, the material used for the funnel substrate should have a refractive index that is at least approximately identical to $n_f$, but it may also be larger. Also, the ratio of the top and bottom of the funnels need not be exactly $n_s^2$. In particular if the distance between the scattering layer and the bottoms of the funnels is not negligible, a smaller ratio may be optimal. A slightly larger ratio will, at the cost of allowing less light to enter the device, concentrate to some extent the light leaving the device in the normal viewing direction. This may be advantageous. Furthermore, the walls of the funnels need not be flat. They may have a different shape. Also, different walls of one funnel may have different shapes. It is expected that the shape of the walls has an effect on the intensity of the additional specular reflections and at which viewing angles these are seen.

The present invention has been described with reference to display technologies characterized by vertical movement of particles. It may also be advantageous for display technologies that use in-plane (parallel to the display surface) movement of particles. Further, the present invention can be combined with a anti-reflection coating on top of the substrate (at the substrate/ambient interface) to realize an additional brightness gain.

In the claims, the word "comprising" does not exclude other elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A reflective display having a viewing side, the display successively comprising, from the viewing side:
   a transparent substrate; and
   a reflective layer, characterized in that the substrate comprises:
      a plurality of funnel-shaped protrusions, each protrusion comprising a base end having a base surface area facing the substrate,
      a top end having a top surface area facing away from the substrate towards the reflective layer, and
      one or more side walls connecting the base end and the top end, the base surface area being larger than the top surface area, and the side walls being arranged to reflect light that is transmitted through the protrusion, wherein the reflective layer comprises a medium having scattering particles dispersed therein and an index of refraction ($n_f$) being less than 1.1 $n_s$, and a ratio of the base surface area and the top surface area is between 0.5 $n_f^2$ and 1.5 $n_f^2$, where $n_s$ is the index of refraction of the substrate.

2. The display according to claim 1, wherein a first base surface area of a first protrusions shares a side with a second base surface area of a second protrusion, the first and second protrusions being neighboring protrusions.

3. The display according to claim 2, wherein a base surface area has a rectangular, a triangular, or a hexagonal shape.

4. The display according to claim 1, wherein the side walls are essentially flat.

5. The display according to claim 1, wherein the reflective layer is arranged to scatter light by approximately Lambertian reflection.

6. The display according to claim 1, wherein the ratio of the base surface area and the top surface area is between 0.9 $n_f^2$ and 1.1 $n_f^2$.

7. The display according to claim 1, wherein the medium is contained in cup-shaped compartments, and wherein the funnel-shaped protrusions are aligned with the compartments such that the top surface areas overlay the compartments.

8. The display according to claim 1, wherein the substrate is used as a sealing layer for the compartments.

9. The display according to claim 1, wherein a relationship between a height (h) of the funnel-shaped protrusions is chosen according to $$h > d \cdot \frac{n_s+1}{2n_s} \cdot \sqrt{n_s^2-1}$$

where d is the width of the base surface area, and $n_s$ is the index of refraction of the substrate.

10. The display according to claim 1, wherein the display is an electrophoretic display.

11. The display according to claim 10, wherein particle motion of electrophoretic particles in the display is generally perpendicular to a display plane.

12. The display according to claim 1, wherein the substrate index of refraction ($n_s$) is greater than an ambient atmosphere at the viewing side, and wherein the reflective layer is arranged to reflect light in a way that at least some of the light is reflected at a propagation angle in the substrate greater than an angle of escape from the substrate to the ambient atmosphere.

13. A method for manufacturing a reflective display having a viewing side, the method comprising steps of:
   providing a transparent substrate; and
   providing a reflective layer comprising a medium having scattering particles dispersed therein and an index of refraction ($n_f$) being less than 1.1 $n_s$, and wherein a ratio of the base surface area and the top surface area is between 0.5 $n_f^2$ and 1.5 $n_f^2$, where $n_s$ is the index of refraction of the substrate,
   providing the substrate with a plurality of funnel-shaped protrusions such that each protrusion comprises a base end having a base surface area facing the substrate, a top end having a top surface area facing away from the substrate towards the reflective layer, and one or more side walls connecting the base end and the top end, wherein the side walls are arranged to reflect light that is transmitted through the protrusions.

14. The method according to claim 13, wherein the step of providing the funnel-shaped protrusions comprises:
   forming grooves in the substrate, and
   providing walls of the grooves with a reflective coating.

15. The method according to claim 14, wherein the step of providing the protrusions further comprises filling the grooves with a filling material.

16. The method according to claim 13, wherein the scattering layer comprises cup-shaped compartments containing fluid, and wherein the funnel-shaped protrusions are aligned with the compartments such that the top surface areas overlay the compartments.

* * * * *